June 29, 1965 G. WEISS 3,191,659
RADIANT GAS BURNER
Filed April 7, 1958

INVENTOR.
GERHART WEISS
BY

United States Patent Office 3,191,659
Patented June 29, 1965

3,191,659
RADIANT GAS BURNER
Gerhart Weiss, Flushing, N.Y., assignor to American Thermocatalytic Corporation, Mineola, N.Y., a corporation of New York
Filed Apr. 7, 1958, Ser. No. 726,720
5 Claims. (Cl. 158—116)

This invention relates to thermocatalytic elements, and more specifically, to thermocatalytic elements of high intensity output within a minimum of space and high efficiency.

One of the objects of the invention is to provide a catalyst or thermocatalytically active material whether of high or low activity or operative at high or low temperature, applied to a fibrous support, i.e., to a great number of very thin but elongated particles which are intertwined so as to form a more or less coherent layer or body of relatively large thermocatalytically active surface dimension while at the same time transmissive to the fuel vapors.

A more specific object of the invention is to use as a support for the thermocatalytically active substances refractory or ceramic fibers such as are made of aluminum silicate and available for example on the market under the same of Fiberfrax.

Another object of the invention is to provide on the fibers or fibrous texture, a thermocatalytic substance of relatively low activity or of an activity only effective within a relatively limited temperature range such as at the temperature just below the de-crystallization or decay point of the ceramic fibers and other components of the structure.

Still another object of the invention is to provide on the ceramic fibers or fibrous texture a thermocatalyst of high thermal resistance and relatively low expansion, or of an expansion substantially equal to that of the fibrous support.

A further object of the invention is to provide on a thermocatalytically relatively less active carrier a further application of a relatively high active layer or a layer specifically reactive with a particular fuel.

An object of the invention is to provide a ceramic fibrous structure impregnated with a catalytically active material directly, for example, in solution with a solvent evaporable under controlled drying conditions.

An additional object of the invention is to provide a thermocatalytically active material in the form of a binder on the fibrous particles.

A more specific object of the invention is to provide a ceramic fibrous structure of sheeted configuration having a suitable carrier impregnation and, superimposed thereupon the activating substance in solution followed by a controlled drying process.

Another object of the invention is to provide on the fibrous structure which has been previously wetted with an evaporable liquid, the catalytic carrier in the form of relatively coarse grains which adhere to the wetted fibers in a predetermined quantity, with the surplus having been removed, for example, by shaking and the sheeted structure thereafter having been rolled into a multilayer body or tube.

In another embodiment of the invention thermocatalytical particles of relatively very fine grain are used in a solution which is applied under pressure to a fiber sheet, for example, by rolling.

In all these cases according to another feature of the invention the grains of the thermocatalyst may be active alone at relatively high temperatures or they may be provided previously with more active impregnations to permit operation or starting at lower temperature.

Alternatively, according to another object of the invention grains and fiber may be combined and further activation be effected by applying another impregnation to the grain-impregnated fiber sheeting.

It is furthermore an object of the invention to provide on a fiber sheet or body already impregnated as before another impregnation of a relatively less active thermocatalyst so as to increase stiffness and flow resistance thereby equalize combustion.

It is also an object of the invention to operate a thermocatalytic structure preferably of fibrous configuration at a temperature about halfway between the temperature of optimum stoichiometric operation and the temperature of extinction at full lean operation.

A specific object of the invention is a sheeted thermocatalytic structure made of refractory fibers rolled or molded into a tube with one end closed and the other end serving as inlet for the air-fuel mixture or in reversed flow as outlet for the exhaust vapors.

In this respect, it is an object of the invention to provide in a molded or rolled fibrous structure, electric heater coils to facilitate starting at lower temperatures and to permit the use of thermocatalytic material which is relatively inactive or active only at higher temperatures.

These and other objects of the invention will be more fully understood from the drawings annexed herewith in which FIG. 1 represents a tubular catalytic element embodying certain features of the invention.

Figure 8A:
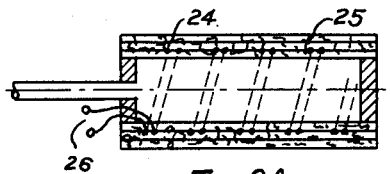

FIGS. 8A, B, C and D illustrate the incorporation of electric windings into a fibrous structure according to the invention.

One of the principal materials used as carrier in the various thermocatalytic structures embodying the invention is a material known as Fiberfrax which is a product of the Carborundum Company. This material is an aluminum silicate fiber which is commercially available in a variety of forms as, for example, in the form of Fiberfrax paper which resembles soft blotter in texture and may be rolled on a mandril and the layers adhere to each other when wet so as to form a tube of the desired wall thickness.

Alternatively, it is also possible to mold such a tube by suspending such silicate fibers in a liquid vehicle and molding them within a separable screen form as is well known from the art of pulp molding.

The invention, however, is not limited to the use of Fiberfrax in one form or another nor, generally, to the use of ceramic fibers consisting of aluminum silicate.

Other types of aluminum silicate or silicate fibers or generally high temperature resistant fibers may be used in accordance with the different characteristics and requirements apparent from this disclosure and without departing from its scope.

The following will deal primarily with the impregnation of the sheet stock and the manufacture of tubes therefrom. However, it should be clearly understood that no limitation is implied in the geometry or the specific method of manufacture of such catalytic bodies.

In the impregnation and treatment of these catalytic elements broadly speaking, five categories have been found of which four are basic, and the fifth one includes cross related and hybrid structures.

Group 1

This group deals with impregnation of Fiberfrax sheet by a catalytically active material or element directly.

Thus the flat sheet or the rolled form is saturated with a solution of chloroplatinic acid ($H_2PtCl_6 \cdot 6H_2O$) in alcohol or water (½%, 2%, 5% or more). Subsequently, the solvent is removed by heating and thereafter the platinum salt decomposed so as to result in a deposit of platinum on the individual fibers. Care must be taken in the drying operation that the distribution of the solution remains reasonably uniform throughout the fibrous body since for instance the application of heat to the outside surface will cause the remainder of solution to migrate towards that surface.

Alternatively, a degree of pre-drying in the flat sheet is indicated, unless of course a concentrated deposit is desired as for instance on the inside surface of a cylindrical element. In this case the outside surface of the tube is protected for example by a metal or glass tube or wrapped in aluminum foil or non-reactive plastic so as to prevent evaporation and the inside dried and fired accordingly.

In this connection and pertinent to the following paragraphs it is important to note that other elements or groups of elements or compounds may be employed in a variety of combinations.

For instance it has been found that the didymium oxide (DiO) which is deposited from an alcoholic solution of the didymium nitrate ($Di(NO_3)_3 \cdot 5H_2O$) showed sustained activity with methanol but this reaction had to be initiated at elevated temperature.

Further a deposit of chromic oxide ($Cr_2O_3$) which can be obtained from a suitable salt such chloride or nitrate, showed good activity with propane fuel.

Group 2

This approach utilizes materials which are catalytically relatively inactive or which exhibit some activity only with select fuels. These materials are also known as carriers since they usually serve as a base for the deposition of catalytically active elements as will be shown in the following groups.

For this purpose the following substances may be used:

Zirconium oxide, silica, didymium oxide, alumina, chromium oxide and other highly refractory compounds listed in diminishing order of preference.

Of these substances, zirconium oxide has been found to be best because of relatively low thermal expansion and high temperature resistance. Alumina on the other hand shows a tendency to crack under continued exposure to high temperature. This property is exhibited to a much lesser extent by didymium oxide which exhibits the desirable property of catalytic activity with certain fuels as for instance methyl alcohol. Chromium oxide appears active with propane and does not appear to impart any noticeable stresses to the structure; for this reason no cracking was experienced.

All of the above materials also act as binders or stiffeners of the fibrous mat and elements for the catalytically stabilized flame system, which are described in a relating disclosure, are made according to materials employed in this group.

A typical zirconia element is made out of a sheet of Fiberfrax 9.75" x 12" and 0.020" thick. This material is wetted with alcohol or water, rolled on a ⅜" mandrel and air dried. It is then dipped in a solution of zirconium tetrachloride in methanol (32.6% by weight). The total volume of solution taken up by the five turn Fiberfrax tube is in the neighborhood of 60.3 cm.$^3$.

Thereafter the tube is dried, preferably uniformly, in order to prevent solution migration unless otherwise desired, and the zirconium salt decomposed.

From this impregnation 10.6 g. of zirconia ($ZrO_2$) are formed. This is equivalent to 90.5 mgm./sq. in. of sheet surface.

The decomposition reaction from the salt to the oxide proceeds as follows:

$ZrCl_4$ salt in light green solution—$ZrCl_2$ which is black—$ZrO_2 + Cl_2$ the final decomposition stage (by taking up $O_2$ from the atmosphere). The resultant tube is closed on one end and on the opposite end a feed or tube for the gas-air mixture is attached. The element thus manufactured measures 10" in length and when used in the stabilized flame system, is produced 4.35 kw., or a power density of 290 watts per sq. in. of active outside surface.

Similarly a didymium impregnated element was produced by dipping an 8" x 12" Fiberfrax sheet in a 30% (by weight) didymium nitrate solution in alcohol. The total volume of solution absorbed amounted to 48.9 cc. which, upon decomposition, yielded 14.67 grams of didymium oxide. Deposition density is 153 mgm./in.$^2$ and, at a total flow of 61.6 l./min. of a gas-air mixture at stoichiometric ratio of 1:9:33, the total heat output was 3.69 kw.

It is apparent that the concentrations of solutions and of impregnations may be varied over wide limits without essentially changing the scope of this disclosure or limiting it in any way.

Group 3

This group combines the first two in that first a suitable carrier is deposited on the fibre sheet such as zirconia and subsequently treated with an active element such as platinum or palladium as described in Group 1.

In this case the precious metal concentrations are held as low as practical for price reasons, usually 2% or less by weight of the carrier. This application of the precious metal treatment follows complete decomposition of the carrier salt and I observed caution in the drying operation so as to prevent unwanted solution migration (see previous description), unless desired for predetermined inside concentrations.

Group 4

Under this heading a granular catalyst is employed which consists for example of F-grade alumina (Aluminum Corporation of America) which is impregnated with ⅒% to 10% by weight with platinum or equivalent, preferably ½ to 1%.

This deposition is made from a platinum salt solution as described previously. In this case among others the two further sub-groups of methods have been found, namely; (4a), coarse grain elements; and (4b), fine grain elements.

According to sub-group (4a) a fiber sheet is laid out flat, wetted with water, alcohol, or equivalent and a layer of the above described granular catalyst deposited thereon by shaking from a screen. A certain number of grains, in depth, will absorb fluid from the fiber sheet and the surplus may be shaken off by simply tilting the sheet on its support plate. In this manner fairly accurate layer thickness control is achieved.

Following this, the sheet is rolled over a mandrel and the resultant product closely resembles a jelly-roll.

The grain size for this process might, for example, be 30 mesh.

In sub-group (4b) a much finer mesh catalyst is used which is prepared exactly as above, except that the grains are ballmilled until they pass about 200 to 900 Tyler mesh, preferably 600 to 800.

This powder is suspended in a suitable solvent such as alcohol, and brushed or rolled on to a fiber sheet with resultant penetration into the fibrous structure.

In this manner a more homogeneous structure is achieved than was possible with the coarse grains. In fact, the grains are thoroughly absorbed into the fiber sheet and cause no separation of adjacent layers after rolling.

It has been found that impregnations of the order of 50 mgm. of powder catalyst per sq. in. of Fiberfrax surface are a desirable impregnation density. Higher densities will introduce greater flow resistance without materially changing operational characteristics, while lower densities result in non-uniform combustion, excessive temperatures, and low power densities.

Group 5

This group combines the granular structure with an additional impregnation to achieve certain desirable results.

For instance, it may be desired to treat a tube made according to Group 4 with zirconia to impart body and stiffness and also to raise flow resistance so that more uniform combustion will result.

Alternatively, a treatment with didymium nitrate, resulting in the deposition of the oxide may be indicated, and this deposit will not only impart mechanical strength but also catalytic activity in connection with certain fuels such as natural gas and alcohol.

General

It is understood that the above elements are not limited to the materials and the examples given.

For instance, in place of didymium, other rare earths have been used successively in accordance with the invention as well as other members of the precious metals group such as palladium.

It has further been found that nickel oxide and chromic oxide impart stiffening properties to the Fiberfrax structure without undue tendency to crack under heat as in the case of aluminum oxide.

It has also been found feasible to build up a layer of powder catalyst according to sub-group (4b) on top of the fiber sheet without rolling it into the fiber structure, thus achieving a layer-wound construction similar to the coarse grain method described in sub-group (4a) etc.

Finally, if required, a metal coating may be deposited or precipitated on the Fiberfrax structure to improve its thermal conductivity. This deposit is imparted prior to the impregnation steps mentioned above.

Element structure

The element structure may assume many different forms and in fact this is one of the advantages of the invention.

Figure 1:
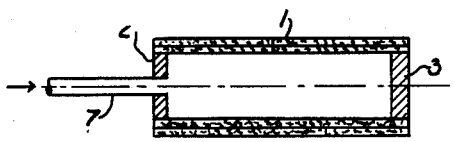
Figure 2:
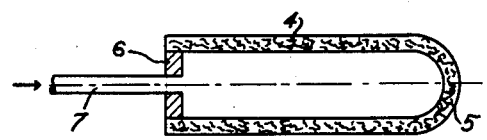
FIG. 2 represents a molded modification of FIG. 1 and FIG. 3 another modification of FIG. 1.

For the purpose of a better illustration, of the great number of feasible structures, two examples have been illustrated in accordance with the invention, namely, the rolled sheet according to FIG. 1 and the pulp-molded construction schematically illustrated in FIG. 2.

In the rolled construction, FIG. 1, tube 1 consists of a number of fiber layers and requires metal or preferably ceramic closures 2, 3 at both ends.

According to FIG. 2, molded tube 4 has one end closed at 5 during the molding process while the other end is closed by ceramic stopper 6.

In both cases the inlet tube for the air-fuel mixture is indicated at 7.

Figure 3:
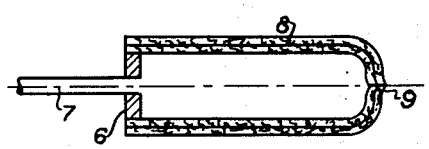

Alternatively, according to FIG. 3, the sheet-wound tube 8 is crimped in its soft state so as to close one end at 9.

While in FIGS. 1, 2 and 3 the gas-air flow is shown at 7, entering co-axially with the axis of the cylinder, this is not indispensable and, if desired, the supply line may enter at any point of the cylinder surface. Thereafter, flow passes radially perpendicular to the surface and through the wall of the element.

With elements of cylindrical configuration such as shown in FIGS. 1, 2 and 3, higher temperatures (i.e. higher power densities) have a tendency to accumulate near the inlet tube. This appears attributable to the lower flow resistance at this point. This phenomenon may be overcome by increasing the flow resistance for example by providing at this point a denser structure or a higher impregnation, or by using feed tubes of the types shown in FIGURES 4 and 5.

Figure 4:
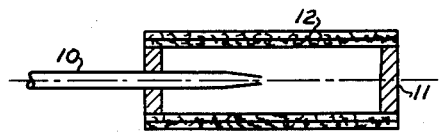
FIGS. 4 and 5 illustrate practical systems for feeding the air-fuel mixture into tubes such as shown in FIGS. 1–3.

Tube 10 shown in FIGURE 4 tends to project the gas-air stream, as shown, to the opposite end 11 of the element 12. This effect can be varied by longitudinally adjusting fuel tube 10 to enter more or less into the interior of fiber tube 12.

Figure 5:
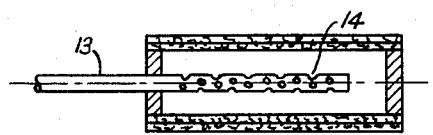

In FIGURE 5 tube 13 introduces a more or less uniformly diffused stream of air-gas mixture into the element by virtue of its perforations 14. This effect can also be predeterminedly varied by appropriate arrangement and dimensioning of perforations 14.

Generally, uniformity of combustion along the cylinder surface depends also upon its geometry; and it has been found that elements of 1" inside diameter and 8" in length perform well over their entire surface. On the other hand, this 8 to 1 ratio may have to be reduced to about 6:1 for elements of ⅜" inner diameter. This may be explained on the basis of the smaller volume per unit area enclosed by the smaller cylinder as compared to the larger one and the consequently different flow characteristics.

Figure 6:
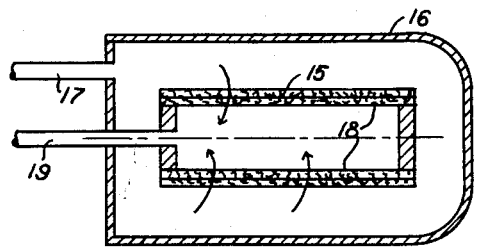
FIG. 6 represents a tubular structure permitting controlled supply of exhaust of the various gases into and from a catalytic structure according to the invention.

Alternatively, if desired, and according to FIG. 6, the flow cycle may be reversed when arranging one of the elements such as shown in FIGS. 1 to 5, and schematically indicated at 15 in a combustion chamber as shown in FIG. 6, at 16. In this arrangement air fuel flow enters the chamber first at 17, then passes through the element wall 18 and leaves at 19 and through what was in previous instances shown as the feed tube. In this case, the glowing surface will be the inner surface of tube 15.

It has further been noted that a rise in pressure accompanies the start of combustion and that the pressure inside the element or the back pressure increases with increasing power density or output.

Thus, a catalytic element in accordance with the invention may be found to register a pressure of 10 mm. Hg under cold flow conditions, and upon initiation of combustion this reading might increase to 30 mm. Hg and remain constant for constant flow. In this manner pressure may be used to control combustion in an installation and in place of a thermostat, a manostat could be used, all this without departing from the scope of this disclosure.

Operating temperatures

Several life tests were performed in order to find the maximum allowable operating temperatures (and therefore maximum power output) consistent with maximum element life. These tests were performed with alumina carriers whose inversion point from the γ-phase to the α-phase (the porous to the sintered or dense structure) is in the vicinity of 1150° C. These theoretical data were corroborated by tests which were started at 1400° C., 1175° C. and 1100° C. respectively.

No change of performance was noticed for the first twenty hours of operation, but following this, the 1400° C. element dropped to 1100° C. over a period of approximately 70 hours where it reached a plateau for about 20 hours only to drop again rather steeply to about 970° C. At this point considerable amounts of carbon monoxide were noted in the exhaust and the test discontinued. The 1175° C. element dipped to about 1025° C. after 50 hours of operation where it levelled off, remaining steady for over 800 hours of operation to date. The 1100° C. element, on the other hand, has remained at this temperature for an equally long period without apparent decay. This leads to the conclusion that the last-cited element not only sustained no damage, but consistently yielded the highest power output of the three. It appears, therefore, that the optimum operating temperature for aluminum carriers is around 1100° C.

It should be noted that throughout these tests the air-gas flow through each element was held constant but, of course, may vary from element to element. Activity was measured by temperature observations, since temperature varies as power output.

For smaller diameter elements (⅜" inside diameter) the power density based on inside surface was of the order of 40 w./in.² to 60 w./in.² up to 100 w./in.² while 1" I.D. elements averaged 90–120 w./in.². This is due to the smaller volume/surface ratio of the smaller elements, which is responsible for greater heat concentrations (reflections from wall to wall).

Combustion curve

Figure 7:
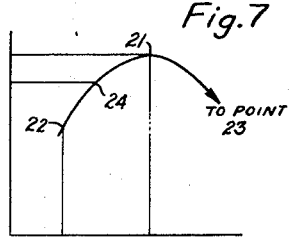
FIG. 7 illustrates graphically a preferred mode of operation.

The diagram of FIG. 7 relates air-fuel stoichiometry to operating efficiency or temperature and is applicable in its general form to the operation of any catalytic element and any fuel and oxidizer.

Specifically for example reference is made to a mixture of air and natural gas whose stoichiometric ratio is 9.33:1. This operating point is shown in FIG. 7 at 21 as the optimum combustion condition at which power output and measured temperature will be maximum. To the right of this point a richer mixture will cause a drop in efficiency as indicated by the declining curve, and to the left of this line a similar condition will result due to a leaner mixture.

It is the nature of combustion processes that they will cease at points 22, 23, on either side of optimum.

However, since operation in the rich domain will produce carbon monoxide and combustible exhaust products, it has been found that operation in the lean domain at point 24 about midway between optimum and extinction would give the best result or could be considered to be the most judicious choice for normal operation. This mode of operation allows for some deviation in mixture (which could be caused by varying line voltage and consequent changes in pumping rate, variations in gas line pressure etc.), without producing undesired or dangerous reaction products such as CO, or permitting partial combustion.

Igniters

Generally there are three means of initiating thermocatalytic combustion. These are (1) chemical, (2) mechanical, (3) electrical.

Means (1) is utilized in the form of exothermic chemical reaction of which many are known to the art.

For example, initial or starting heat for the element may be derived from percussion caps, or a percussion cap initiated aluminum-iron oxide reaction which resembles a small dry cell in appearance and which is marketed by the Mine Safety Appliances Company, Pittsburgh, Pennsylvania under the trade name of Redi-Heat.

Preheating can also be effected by catalytic elements using platinum with methyl alcohol or hydrogen fuels. These, and especially the latter, are capable of inducing auto-excitation, that is the element will start to operate from generally encountered ambient temperatures. Once started, these elements are then switched over to a regular fuel supply such as natural gas, propane, gasoline, etc., and the starter fuel, which might be contained in a small tank or cartridge is conserved for the initial short run periods.

Preheating means (2) involves the use of pyrophoric means (flints) and adiabatic compression of the gas-air mixture.

Preheating means (3) encompasses all electrical ignition means such as spark ignition, arc ignition and ignition by electric resistance element. This latter one has been found to be most useful and for this reason will be explained in some detail.

FIG. 8A shows an arrangement in which the resistance wire 24 in the form of a bifilar helical winding fed over line 26 by A current is embedded or in contact with the catalytic element wall 25. It is desirable to position the element so that during operation of the catalytic element, the electric element will be kept at a low temperature, thus minimizing decay and aging effects.

Figure 8B:
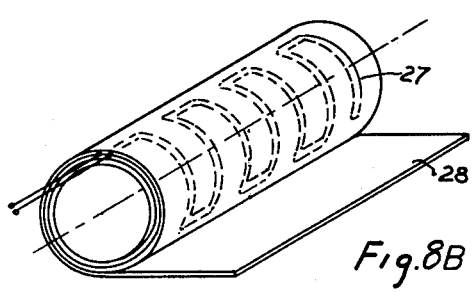
Figure 8C:
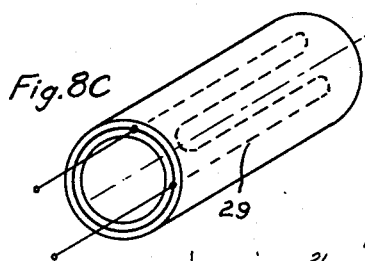

FIG. 8B shows the bifilar winding 27 embedded in sheeted wall 28 in a zag zag configuration and FIG. 8C shows a longitudinal loop arrangement 29.

Generally, the electric resistance elements such as shown at 24, 27, 29 in FIGS. 8A, B, C, respectively, need not be metallic wires but may also be made of carbon or similar materials and should preferably be coated with ceramic coating so as to reduce oxidation and reduction effects.

Figure 8D:
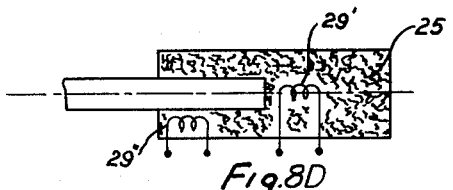

Alternatively, as shown in FIG. 8D, platinum wire or platinum plated Nichrome or tungsten wire elements, in one of the two positions 29', 29", may be used as preheating or starter elements without departing from the scope of this disclosure. In position 29' the igniter is exposed to the air-gas stream and even continues to glow; in position 29" only when ignited.

Alternate element structures

While the elements described are composed of a fibrous ceramic body, it is to be noted the Fiberfrax material mentioned above may be replaced by other fibrous material for instance a material known as Refrasil can be used, which is a 96% silica ($SiO_2$) sheet of fibrous nature quite similar to the Fiberfrax material. Refrasil is marketed by Thompson Fiber Glass Company of Los Angeles, and while its properties are not as desirable as those of Fiberfrax, it has nevertheless been found useful for the purpose of this invention.

For certain applications it is required that the flow resistance of a catalytic element be held to a minimum. In order to achieve this purpose, the amount of binder and winding tension are varied.

However, in accordance with particular requirements beyond certain minimums, other means are applied.

The invention is not limited to the configurations of elements or accessories illustrated or described but may be applied in any appropriate form or manner whatsoever without departing from the scope of the claims.

I claim:

1. In a combustion apparatus, a closed, hollow rigid body to which a combustible gas-air mixture is supplied, said body having a combustion wall forming an exterior surface of said hollow body and comprising discrete, amorphous, inorganic, ceramic fibers arranged and bonded to each other at an elevated temperature to form a self-supporting, homogeneous, porous wall structure having opposed surfaces, the fibers on the exterior surface being adapted to incandesce and remain mechanically and thermally stable and said exterior wall structure being adapted to remain stable when said wall surface layer is maintained for prolonged period of time at high operating temperature, said pores being oriented generally in the direction between said surfaces to permit gas flow through said wall in the directon toward said one incandescent exterior surface from the other surface, and means for conducting a gas-air mixture into said closed hollow body so it may flow through said wall in said direction.

2. A combustion wall in accordance with claim 1, said fibers being composed of a melt of alumina and silica.

3. In a combustion apparatus, a closed, hollow rigid body to which a combustible gas-air mixture is supplied, said body having a combustion wall comprising discrete, amorphous, inorganic fibers which are a melt of alumina and silica, a refractory inorganic binder selected from the group consisting of zirconia, silica, didymium oxide, alumina, nickel, oxide and chromium oxide, coating said fibers, said fibers crossing each other and being fixed to each other at their crossovers by said binder so as to rigidify said wall structure, said fibers being arranged and bonded to each other at an elevated temperature to form a self-supporting, homogeneous, porous wall structure forming the exterior surface of said hollow body, the fibers on the outer surface layer being adapted to incandesce and remain mechanically and thermally stable and said wall structure being adapted to remain stable when said wall surface layer is maintained for prolonged period of time at high operating temperature, said pores being oriented generally in the direction between said surfaces to permit gas flow through said wall in the direction toward said one surface from the other surface, and means for conducting a gas-air fuel mixture into said closed hollow body so it may flow through said wall in said direction.

4. A combustion wall in accordance with claim 3, said refractory binder being zirconium oxide.

5. A combustion wall in accordance with claim 3, said fibers also having deposited thereon a precious metal catalyst selected from the group consisting of platinum and palladium for said gas-air fuel mixture.

References Cited in the file of this patent

UNITED STATES PATENTS

| | | |
|---|---|---|
| 1,195,219 | Hedstrom | Aug. 22, 1916 |
| 1,213,470 | Finlay | Jan. 23, 1917 |
| 1,309,623 | Henwood | July 15, 1919 |
| 1,336,402 | Weiss | Apr. 6, 1920 |
| 1,502,807 | Berger | July 29, 1924 |
| 1,567,691 | Wiederhold | Dec. 29, 1925 |
| 2,568,144 | Cremer et al. | Sept. 18, 1951 |
| 2,674,539 | Harter | Apr. 6, 1954 |
| 2,731,359 | Nicholson | Jan. 17, 1956 |
| 2,775,294 | Schwank | Dec. 25, 1956 |
| 2,821,510 | Gottwald | Jan. 28, 1958 |
| 2,879,837 | Downs | Mar. 31, 1959 |
| 2,984,576 | Alexander et al. | May 16, 1961 |
| 3,061,416 | Kazokas | Oct. 30, 1962 |

FOREIGN PATENTS

| | | |
|---|---|---|
| 542,465 | Belgium | Nov. 14, 1955 |
| 1,056,454 | France | Oct. 21, 1953 |
| 2,100 | Great Britain | of 1900 |

JAMES W. WESTHAVER, *Primary Examiner.*

FREDERICK L. MATTESON, JR., FREDERICK KETTERER, PERCY L. PATRICK, ROBERT A. O'LEARY, *Examiners.*

UNITED STATES PATENT OFFICE
CERTIFICATE OF CORRECTION

Patent No. 3,191,659

June 29, 1965

Gerhart Weiss

It is hereby certified that error appears in the above numbered patent requiring correction and that the said Letters Patent should read as corrected below.

Column 1, line 26, for "same" read -- name --; column 5, line 28, for "successively" read -- successfully --; column 7, line 62, for "means" read -- metals --; column 8, line 2, for "zag zag" read -- zig zag --.

Signed and sealed this 28th day of December 1965.

(SEAL)
Attest:

ERNEST W. SWIDER
Attesting Officer

EDWARD J. BRENNER
Commissioner of Patents